(12) United States Patent
Mikkelson et al.

(10) Patent No.: US 7,930,723 B2
(45) Date of Patent: Apr. 19, 2011

(54) DOWNLOADING PREVIOUSLY AIRED PROGRAMS USING PEER-TO-PEER NETWORKING

(75) Inventors: Erik C Mikkelson, Fremont, CA (US); John Y. Affaki, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 11/116,813

(22) Filed: Apr. 28, 2005

(65) Prior Publication Data

US 2006/0248553 A1 Nov. 2, 2006

(51) Int. Cl.
H04N 7/173 (2006.01)
(52) U.S. Cl. .................................... 725/86; 725/116
(58) Field of Classification Search .............. 725/86
See application file for complete search history.

(56) References Cited

U.S. PATENT DOCUMENTS

| | | | |
|---|---|---|---|
| 2002/0147816 A1* | 10/2002 | Hlasny | 709/227 |
| 2006/0168625 A1* | 7/2006 | Gildred | 725/58 |
| 2006/0218222 A1* | 9/2006 | Brahmbhatt et al. | 709/201 |
| 2007/0174471 A1* | 7/2007 | Van Rossum | 709/229 |

OTHER PUBLICATIONS

Modeling and Performance Analysis of BitTorrent-Like Peer-to-Peer Networks. Qiu et al. SIGCOMM '04.*
PROMISE: Peer-to-Peer Media Streaming Using CollectCast. Hefeeda et al. MM'03.*
"What is BitTorrent?", http://www.bittorrent.com/introduction.html, printed Mar. 23, 2005, pp. 1-2.
Lynch, Chris; "Getting started with BitTorrent and Azureus," NewsForge, printed Mar. 23, 2005, pp. 1-4.
"Replay TV 4000 User Guide", Chapter Five: Networking, 2001, pp. i, xvii-xx, and 55-62.
"ReplayTV 4500 FAQ", printed Mar. 23, 2005, pp. 1-8.
"Getting Started with the TiVoToGo(TM) Feature", TiVo Customer Support, printed Mar. 23, 2005, pp. 1-3.
"Getting Started with Multi-Room Viewing," TiVo Customer Support, printed Mar. 23, 2005, pp. 1-4.

* cited by examiner

Primary Examiner — Scott Beliveau
Assistant Examiner — Bennett Ingvoldstad
(74) Attorney, Agent, or Firm — Lee & Hayes, PLLC

(57) ABSTRACT

Downloading previously aired programs using peer-to-peer networking includes, in certain aspects, sending a request identifying a previously aired program to a computing device. A list of a plurality of client devices that may have at least a portion of the previously aired program are received from the computing device, and portions of the previously aired program are received from one or more of the plurality of client devices.

16 Claims, 6 Drawing Sheets

DOWNLOADING PREVIOUSLY AIRED PROGRAMS USING PEER-TO-PEER NETWORKING

TECHNICAL FIELD

This invention relates to recording television programs, and particularly to downloading previously aired programs using peer-to-peer networking.

BACKGROUND

Digital video recorders (DVRs) have become very popular in recent years, increasingly replacing VCRs as the primary device for users to record all manner of television programs. In a DVR, programs are stored on a hard disk drive rather than on a VHS tape, which results in numerous benefits. Hard disk drives can typically store more programs than a VHS tape, can record one program while another previously recorded program is played back, can allow a user to begin watching a program that has already begun recording before the recording is completed, can oftentimes support better video and/or audio quality than a VHS tape, can allow indexing so that users can quickly see what programs are stored on the DVR and can quickly select programs for playback, can support random access to programs so that rewinding or fast forwarding to a particular portion of a tape is not required, and so on.

The manner in which a user selects programs to be recorded on a DVR can vary. One way in which programs can be selected for recording is to display an electronic program guide (EPG) to the user that allows the user to scroll ahead in time to find and select programs for recording. Another way is to display a search interface to the user that allows the user to enter various search criteria, such as a program title, keywords, actor(s)/actress(es), and so forth. The search criteria are compared to upcoming programs, and any program that satisfies the search criteria can be automatically recorded or an option presented to the user to allow the user to select whether to record the program(s) that satisfy the search criteria.

However, one problem that remains with DVRs is that their ability to record programs is limited to current and future programs. Typically, DVRs are not able to record programs from the past—only programs that are currently being aired or will be aired in the future can be recorded. Thus, if a user realizes that a program he or she would like to record ended an hour ago, or aired the previous night, the user is unable to have his or her DVR record that program. Accordingly, it would be beneficial to have a way for DVRs to overcome this limitation and record programs from the past.

SUMMARY

Downloading previously aired programs using peer-to-peer networking is described herein.

In accordance with certain aspects, a request is sent to a computing device, the request identifying a previously aired program. A list of a plurality of client devices that may have at least a portion of the previously aired program are received from the computing device, and portions of the previously aired program are received from one or more of the plurality of client devices.

In accordance with other aspects, a request is received from a requesting client device for a recording of a previously aired program. A list identifying one or more other client devices that may have a copy of one or more portions of the previously aired program is generated. This generated list is sent to the requesting client device to allow the requesting client device to obtain portions of the previously aired program from one or more of the one or more other client devices.

BRIEF DESCRIPTION OF THE DRAWINGS

The same numbers are used throughout the document to reference like components and/or features.

DETAILED DESCRIPTION

Downloading previously aired programs using peer-to-peer networking is described herein. Previously aired programs can be obtained for a user of a client device from other client devices in a peer-to-peer network. An electronic program guide (EPG) can allow a user to scroll to different times and days, whether in the past, present, or future. A search interface can also allow a user to search for programs that occurred in the past, as well as the present and future. If the user selects a program in the past, whether through the EPG or the search interface, a server device checks whether any of the other client devices have a copy of that program stored locally. If such copies are stored by other client devices, the user's client device provides the user with different options for downloading the program (e.g., different quality levels available). If the user chooses to download the program, then segments of the program are transferred from multiple different client devices to ease the transfer burden on each of those devices. Upon completion of the downloading, the program has been copied to the user's client device and is stored thereon.

Figure 1:
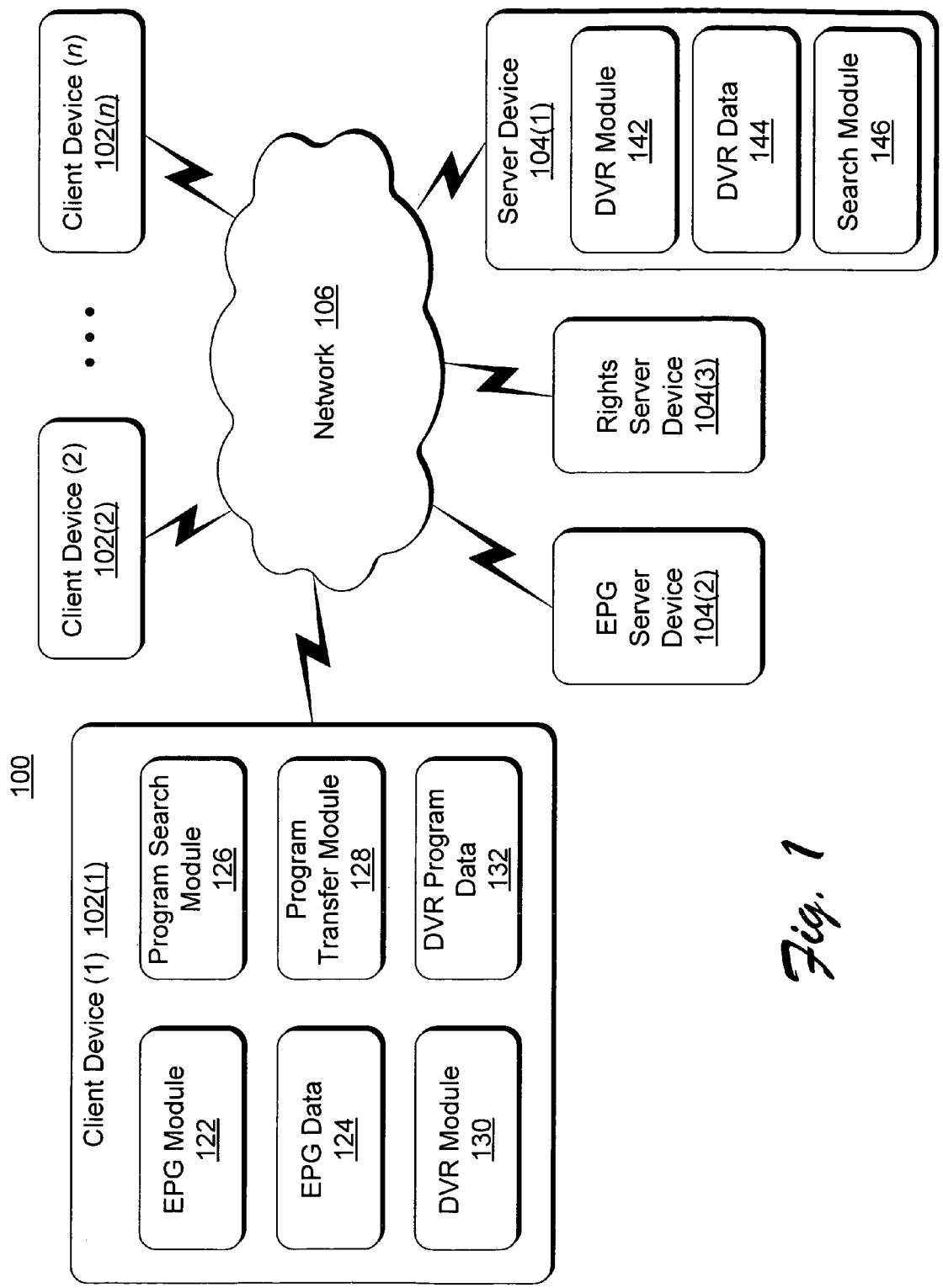
FIG. 1 illustrates an example system in which the downloading of previously aired programs using peer-to-peer networking can be performed.

FIG. 1 illustrates an example system 100 in which the downloading of previously aired programs using peer-to-peer networking can be performed. System 100 includes multiple (n) client devices 102(1), 102(2), . . . 102(n), and multiple server devices 104(1), 104(2), and 104(3) coupled together via a network 106. It should be noted that, although three server devices 104 are illustrated in FIG. 1, system 100 may optionally include fewer server devices 104, or four or more server devices 104. Generally, in system 100, each client device 102 can receive aired programs and optionally record those programs as they are aired. Furthermore, as discussed in more detail below, a client device 102 can also record a previously aired program by downloading the program from other client devices 102 that have recorded the program.

Aired programs refer to all types of television programming content that can be communicated to a client device 102. Aired programs include all varieties of shows, movies, sporting events, and so forth. Aired programs include both content for which no fee is charged to the user of a client device 102, as well as content for which a fee is (or may be) charged to the user of a client device 102.

Aired programs can be transmitted to client devices 102 from a variety of different sources. Examples of such aired program sources include cable head-ends, satellites, radio frequency transmitters, server computing devices, and so forth. Aired programs can be communicated to a client device 102 in any of a variety of manners, such as a satellite transmission, radio frequency transmission, cable transmission, and so forth.

When a program is aired, it is typically communicated to multiple client devices 102 concurrently. Any client device 102 that is tuned or otherwise configured properly to receive that program, and is authorized to receive the program (e.g., the proper fees have been paid or agreed to be paid) can receive the program and present it to a user of the client device and/or record the program. After a program (or portion of a program) has been transmitted, the program or portion thereof is referred to as a previously aired program or portion thereof. For example, if a particular movie is being transmitted from 9:00 pm to 11:00 pm, then after 11:00 pm the entire program is a previously aired program, and after 9:25 pm the portion of the program that was aired between 9:00 pm and 9:25 pm is a previously aired portion of the program.

A client device 102 can be any type of device that can receive and record an aired program. Each client device 102 can also typically present the received programs to a user of client device 102 as the programs are being received. For example, client device 102 could be a set-top box, a digital video recorder (DVR) and playback system, a personal video recorder (PVR), an appliance device, a gaming system, a desktop or personal computer, and so forth. The different client devices can be spread across different geographic locations, such as in different homes, different cities, different states, or even different countries.

Each client device 102 includes an electronic program guide (EPG) module 122, EPG data 124, a program search module 126, a program transfer module 128, a DVR module 130, and DVR program data 132. In order to avoid cluttering the drawings, only one client device in FIG. 1 is illustrated as including these modules and data 122-132, although it is to be appreciated that all client devices 102 include such modules and data. Each of modules 122, 126, 128, and 130 can be implemented in software, firmware, hardware, or combinations thereof. Each of data 124 and 132 is stored on a storage device of client device 102, such as a magnetic disk, optical disk, solid state memory, and so forth.

Server device 104(1) includes a DVR module 142, DVR data 144, and an optional search module 146. An EPG server device 104(2) and a rights server device 104(3) are also illustrated in FIG. 1. Although three server devices are illustrated in FIG. 1, the functionality provided by these three server devices can alternatively be combined into fewer server devices (e.g., a single server device), or spread across a larger number of server devices (e.g., two or more server devices may perform the functionality of EPG server device 104(2), two or more server devices may perform the functionality of server device 104(1), and so forth).

EPG data 124 includes data describing the various aired programs that may be transmitted to client device 102. This data is received by client device 102 from EPG server device 104(2). For each program, different data describing the program can be included, such as the title of the program, the actor(s)/actress(es) in the program, a description of the subject matter of the program, a duration of the program, a time and date that the program is aired, a parental control rating for the program, and so forth. The amount of data stored in EPG data 124 can vary, based at least in part on the amount of storage space available to store EPG data 124. EPG data 124 includes data for aired programs from the past, present, and future.

EPG module 122 processes EPG data 124 and generates electronic program guides for display which enable a viewer to navigate through an onscreen display and locate aired programs. The user is able to scroll through different channels carrying different aired programs, and can also scroll through different times. The user is able to see a display of programs currently being aired, as well as scroll into the future and the past. Scrolling into the future allows the user to locate programs that will be aired in the future and select them for recording. Scrolling into the past allows the user to locate previously aired programs (or portions thereof) and select them for recording, as discussed in more detail below.

Program search module 126 also processes EPG data 124, but presents a program search interface to the user rather than a program guide. Program search module 126 allows the user to enter various search criteria, compares the search criteria to EPG data 124, and displays to the user of client device 102 a list of the aired program(s) that satisfy the search criteria. The user can search on any of a variety of criteria that corresponds to data maintained in EPG data 124, such as the title of a program, the actor(s)/actress(es) in a program, keywords in the title or description of the subject matter of the program, program genre or type, and so forth. The user can also search on a time criteria, such as by entering a particular time, day, and/or date, by entering that only programs in the future should be found, by entering that only programs from the past should be found, and so forth.

Alternatively, rather than maintaining EPG data 124 in the client device 102, the EPG data may be maintained at EPG server device 104(2). When presenting a program guide to a user of client device 102, EPG module 122 accesses the EPG data stored at EPG server device 104(2), retrieves the data for the appropriate channels and time, and displays that data to the user. When presenting a search interface to a user of client device 102, program search module 126 forwards the search criteria to EPG server device 104(2) which in turn compares the search criteria to the EPG data and returns data describing the resulting programs that satisfy the search criteria to program search module 126. Alternatively, program search module 126 may forward the search criteria to search module 146 of server device 104(1), which in turn communicates with EPG server device 104(2) to compare the search criteria to the EPG data and return data describing the resulting programs that satisfy the search criteria to program search module 126.

Program transfer module 128 manages the downloading of portions of programs from other client devices 102, as well as the downloading of portions of programs to other client devices 102. As this downloading is performed among the client devices 102, this downloading is referred to as using peer-to-peer networking rather than client/server networking. When a program is downloaded from other client devices 102, program transfer module 128 stores the program as part of DVR program data 132. Program transfer module 128 can perform, for example, the acts of FIGS. 2 and 3 that are performed by the requesting client device, as discussed below. This downloading of programs and portions thereof is discussed in more detail below.

DVR module 130 manages the storage and retrieval of the programs stored in DVR program data 132. When a program is recorded as it is aired, it is stored by DVR module 130 as part of DVR program data 132. DVR module 130 also displays to a user of client device 102 an indication of what previously aired program(s) or portions thereof are stored in DVR program data 132, allowing the user to select recorded programs for playback as well as delete programs from DVR program data 132.

Server devices 104 communicate with client devices 102, and client devices 102 communicate with one another, over network 106. Network 106 can be any of a variety of different types or kinds of networks, and can include multiple types or kinds of networks. For example, network 106 can include local area networks and/or wide area networks, public networks and/or proprietary networks, PSTN (Public Switched Telephone Network) networks and/or ISDN (Integrated Services Digital Network) networks and/or FDDI (Fiber Distributed Data Interface) networks, wired and/or wireless networks, and so forth. In certain embodiments, network 106 includes the Internet.

Server device 104(1) includes a DVR module 142 and DVR data 144. DVR module 142 monitors client devices 102, keeping track of which client devices 102 have recorded which aired programs, and keeping track of which client devices 102 are scheduled to record future aired programs. An indication of any changes that are made at a client device 102 regarding recorded programs is forwarded by client device 102 to DVR module 142. For example, when a user of a client device 102 requests to record a program or delete a previously recorded program, an indication of that request is forwarded by client device 102 to DVR module 142. DVR module 142 can also perform, for example, the acts of FIGS. 2 and 3 that are performed by the server device, as discussed below.

The information obtained by DVR module 142 is stored in DVR data 144. DVR data 144 maintains the data identifying which programs have been recorded (and not yet deleted) by which client devices 102, and which programs are scheduled to be recorded by which client devices 102 in the future. The data that identifies a particular program can take any of a variety of forms. For example, each program may be assigned a different number or character string and those numbers or strings used as the data. By way of another example, the program title in combination with the date, channel number, and/or time aired can be used as the data.

By storing the data describing which programs have been recorded (and not yet deleted) as well as the programs that will be recorded by the various client devices, DVR module 142 knows which programs have already been recorded by which client devices. This information can be used in determining whether a client device is able to download a previously aired program from other client devices, as described in more detail below.

Furthermore, just as DVR module 142 can access DVR data 144 to determine which client devices are scheduled to record which programs in the future, if one of client devices 102 fails and is replaced with a new client device, this new client device can obtain a copy of which programs it should record in the future from DVR module 142. Additionally, just as DVR module 142 can access DVR data 144 to determine which client devices have already recorded which previously aired program, if one of client devices 102 fails and is replaced with a new client device, this new client device can obtain an indication of which programs it should download from other client devices 102 in order to have stored in its DVR program data 132 the same previously aired programs that were stored in the DVR program data 132 of the failed device 102.

In certain embodiments, server device 104(1) includes additional functionality beyond that described with respect to DVR module 142 and DVR data 144, or additional server devices may be included with such additional functionality. For example, server device 104(1) or some other server device (not shown) may also transmit programs to client devices 102, such as by streaming the programs to client devices 102 using an Internet Protocol (IP) format.

Rights server device 104(3) maintains a record of rights that the various client devices 102 have to present and/or record aired programs. These rights are typically on a per-channel basis and include a time component. For example, a client device 102(2) may have rights to present and/or record only certain channels that the user of client device 102(2) has paid for or agreed to pay for, and only for so long as the user pays or agrees to pay for the rights—as soon as the user stops paying or agreeing to pay, the rights to present and/or record those channels stop.

Figure 2:
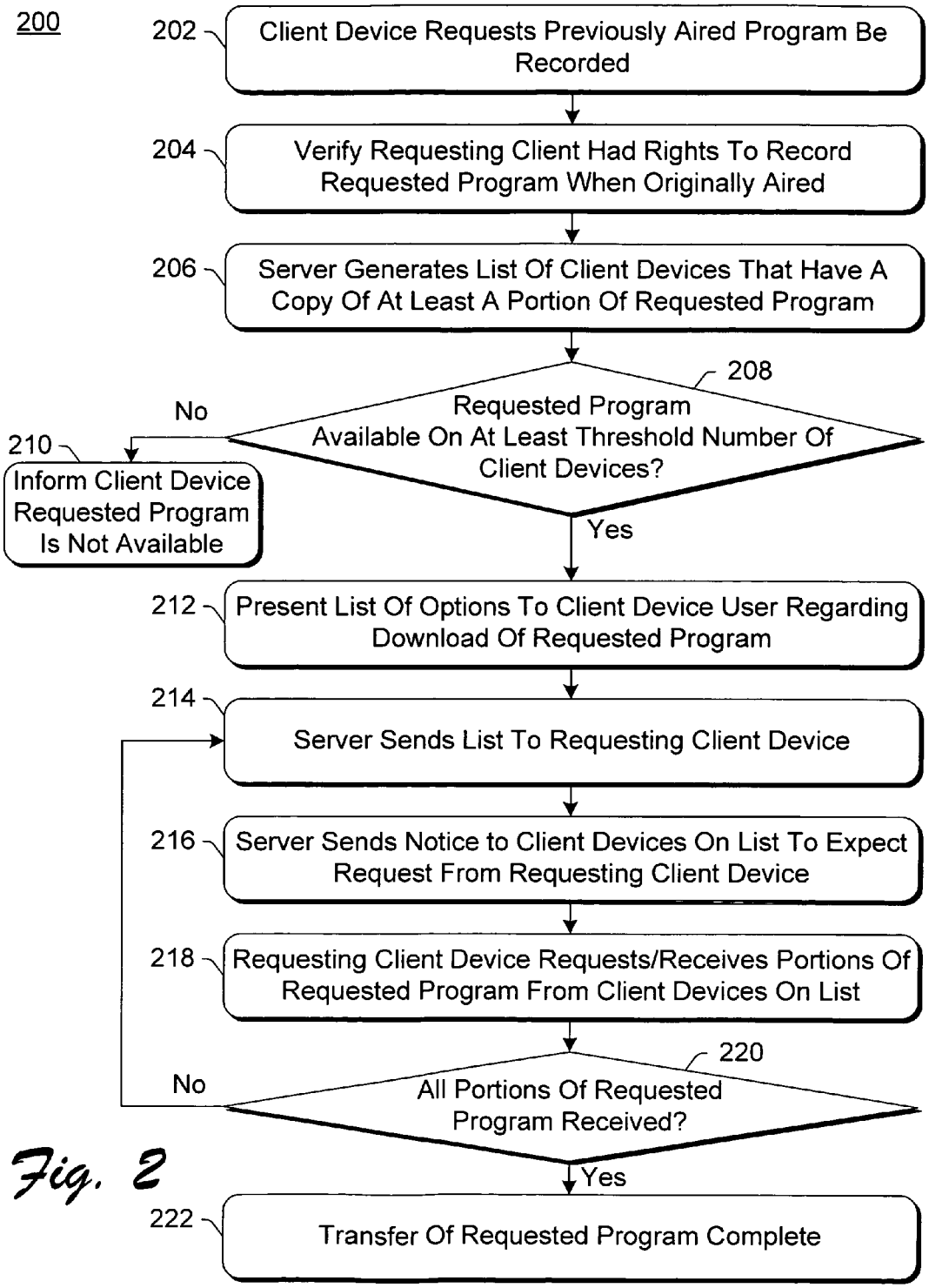
FIG. 2 illustrates an example method for downloading previously aired programs using peer-to-peer networking.

FIG. 2 illustrates an example method 200 for downloading previously aired programs using peer-to-peer networking. The order in which the method is described is not intended to be construed as a limitation, and any number of the described method acts can be combined in any order to implement the method. Furthermore, the method can be implemented in any suitable hardware, software, firmware, or combination thereof. FIG. 2 is discussed with references to client devices and server devices, which can be, for example, client devices 102 and server devices 104 of FIG. 1. Generally, the functionality discussed with reference to FIG. 2 as being performed by a server device is performed by server device 104(1), although additional server devices may alternatively perform the functionality.

Initially, a client device requests that a previously aired program be recorded (act 202). This client device request is sent to a server device in response to a request from a user of the client device that the previously aired program be recorded. Such a request can be input by a user in any of a variety of manners, such as via an EPG or search interface as discussed above with respect to FIG. 1.

In response to the client device request, the server device verifies that the requesting client device had rights to record the requested program when the requested program was originally aired (act 204). This verification can be performed in a variety of different manners. The server device receiving the request in act 202 may perform the verification, or alternatively another server device(s) may perform the verification (e.g., rights server device 104(3) of FIG. 1). In certain embodiments, the server device maintains a record of which client devices are entitled to record which programs. Typically, a client device is entitled to record a program if there is no fee associated with recording the program or if a user of the client device has paid (or agrees to pay) the necessary fee to record the program. For example, some programs are broadcast free of charge, allowing any device that can receive and understand the broadcast signals to play the program for the user and/or record the program for the user. In act 204, the requesting client device would have had rights to record such a program. By way of another example, some programs are transmitted that require a usage fee, either for the entire channel or for a particular program. If the user of the requesting client device has paid, or agrees to pay, the required usage fee then the requesting client device had rights to record the program in act 204. However, if the user of the requesting client device has not paid the required usage fee and has not agreed to pay the required usage fee, then the requesting client device does not have rights to record the program in act 204.

Verifying that a requesting client had rights to record the requested program takes into account the time when the request is made in act 202 and/or the time that the requested program was originally aired. In certain embodiments, the requesting client had rights to record the requested program if the requesting client was authorized to display and/or record the requested program at the time the requested program was originally aired. For example, if the request in act 202 is made today and the requested program was originally aired four days ago, and the requesting client had rights to record the program four days ago but stopped paying the required usage fee two days ago, then the requesting client had rights to record the requested program when originally aired. By way of another example, if the request in act 202 is made today and the requested program was originally aired four days ago, and the client started paying the required usage fee to record the program two days ago, then the requesting client would not have had rights to record the requested program.

Alternatively, the requesting client could be authorized to record the requested program if the requesting client is currently authorized to display and/or record programs being aired on the same channel as the requested program was aired even if the requesting client did not have rights to record the requested program when originally aired. For example, if the request in act 202 is made today and the requested program was aired on channel 432 four days ago, and if the requesting client device did not have rights to play and/or record programs on channel 432 four days ago but the required usage fee to play and/or record programs on channel 432 was paid two days ago, then the requesting device is verified as authorized to record the requested program in act 204.

In certain embodiments, no distinction is made between authorization to present a program (play the program) as it is aired (often referred to as "live" presentation or playing of the program) and authorization to record the program. For example, if the user of the requesting client device has paid the required fee to receive a particular cable or satellite channel, then the requesting client device is authorized to present programs as they are aired as well as record any aired programs on that channel. In other embodiments, the right to present the program as it is aired and the right to record the program are two different rights (e.g., each having different fees associated with it). For example, the user of the requesting client device may pay the required fee to watch programs on a particular cable or satellite channel as they are aired, but not pay the required fee to record those programs. In such embodiments, when the user of the requesting client device has not paid the fee and has not agreed to pay the fee to record the requested program, the requesting client device would not have had rights in act 204 to record the requested program.

If the requesting client device did not have rights to record the requested program when originally aired, then process 200 ends. A notification may be sent to the requesting client device informing it that it is not authorized to record the requested program, and optionally including information describing how the requesting client device could become authorized to record the requested program. Such notifications can optionally be presented to the user of the requesting client device.

If the requesting client device had rights to record the requested program when originally aired, then the server device generates a list of client devices that have a copy of at least a portion of the requested program (act 206). As discussed above, the server device maintains data identifying which programs have been recorded and not yet deleted by which client devices. This data can be accessed and used to determine which client devices have a copy of at least a portion of the requested program.

As part of the data identifying which programs have been recorded and not yet deleted by which client devices, the server device also maintains data identifying which previously aired programs are being downloaded to which client devices. Situations can arise where only a portion of the requested program is available from a particular client device. Such situations can result, for example, because the particular client device itself is downloading the requested program from other client devices and has not yet completed the downloading process, or because the particular client device is recording the program as it is being aired and the airing of the program has not yet been completed.

Situations can also arise where a client device is included in the list of client devices generated in act 206 even though the client device does not yet have any portions of the requested program. Such situations can arise, for example, when a particular client device itself is downloading the requested program from other client devices and, although the particular client device has begun the downloading process, it does not yet have any of the portions of the requested program downloaded to it.

The server device may also optionally include additional information in the list of client devices generated in act 206. This additional information can include, for example, different parameters used in the recording of the requested program by the different client devices. For example, different client devices may have recorded the requested program at different quality levels, such as different quality levels for the video (e.g., low, medium, high, or high definition; regular, good, or best; SP or LP; and so forth) and/or different quality levels for the audio (e.g., basic, CD-quality, Dolby® Digital, Dolby®& Digital 5.1 sound, and so forth). By way of another example, some client devices may have padded the recorded program at the beginning or end, causing the recording of the program to begin a certain number of minutes early or end a certain number of minutes late in order to reduce the chance that any portion of the program was missed due to a change in schedule, a clock being set wrong, the program being transmitted at the wrong time, and so forth. Different client devices (and their users) can select different amounts of padding. All of these parameters are maintained by server device 104(1) in DVR data 144, allowing the server device to include such parameters in the list generated in act 206.

The server device then checks whether the requested program (or portion thereof) is available on at least a threshold number of client devices (act 208). The threshold number can be one or higher. At least one other client device with the program recorded thereon is typically needed, as without such a client device there would not be any source from which the requested program could be downloaded. In some situations, more client devices are required in act 208 in order to improve the user experience (e.g., allow the downloading to continue even if one of the client devices deletes the program or is turned off, spread the burden of being a source of the requested program across a larger number of client devices and thereby reduce the burden each client device carries, and so forth).

If the requested program is not available on at least the threshold number of client devices, then the server device informs the client device that the requested program is not available (act 210). An indication of such can also be presented to the user of the requesting client device.

Additionally, situations could arise where the requested program is available on at least the threshold number of client devices, but an insufficient number of those client devices (e.g., fewer than the threshold number) are currently available. Client devices may not currently be available because they are turned off or malfunctioning, because network problems are preventing access to them, and so forth. In such situations, the server device can place the request in a queue or otherwise record or remember the request so that the program can be transferred to the client device when a sufficient number of those client devices are available. The client device can optionally be informed that the transfer will be delayed until a sufficient number of those client devices is available. Alternatively, rather than queuing or remembering the request, the client device could be instructed to resubmit its request at a later time, thus alleviating the server device of the burden of remembering the request.

However, if the requested program is available, then a list of options is presented to the user of the client device regarding the downloading of the requested program (act 212). These options are based on the parameters used by the different client devices in the recording of the requested program as identified in the list generated in act 206. For example, the user may be presented with different video and/or audio quality options for the requested program, whether the program was padded at the beginning and/or ending and if so by how much, and so on.

The server device sends the list of client devices that have a copy of at least a portion of the requested program, as generated in act 206, to the requesting client device (act 214). If the user has selected particular parameters or options in act 212, then the server device includes in the list only those client devices that satisfy the selected parameters or options. Alternatively, the server device may not exclude any client devices from the list based on the selected parameters or options, but rather rely on the requesting client device to request portions of the program only from those client devices that satisfy the selected parameters or options. It should be noted that in certain embodiments, portions of the requested program can be downloaded from a client device that does not satisfy the selected parameters or options. For example, if the selected option is to have the requested program padded five minutes early, then a client device that did not pad the requested program would not have the five minutes of content prior to the airing of the requested program, but would have the remaining portions of the requested program and could download those portions to the requesting client device.

The server device also maintains a record that the requesting client device is downloading the requested program, and thus is identified as a client device that has a copy of at least a portion of the requested program to any other client devices that may request to record the requested program. It should be noted that the requesting client device can be identified as such at the beginning of the downloading process, even though it has not yet actually downloaded any of the requested program.

The list sent to the requesting client device in act 214 may include all of the client devices that have a copy of at least a portion of the requested program, or alternatively a subset of such client devices. For example, if there are 10,000 client devices with a copy of at least a portion of the requested program, then the requesting client device need not be informed of all 10,000 client devices (e.g., 20, 100, 250, etc. may be sufficient). For each client device on the list sent to the requesting client device, an indication of how to communicate with that client device is included in the list. For example, an address (such as an IP address) of each client device is included in the list, allowing the requesting client device to know what address to use to communicate with those client devices. Alternatively, such indications may be sent to the requesting client device in different manners rather than as part of the list in act 214. For example, the indications may be sent in a separate list, the server device may maintain a record or database of addresses that can be accessed by the requesting client device as needed by the requesting client device, the server device may send a request to the client device to send a message to the requesting client device informing the requesting client device of its address, and so forth.

The server device also sends a notice to the client devices on the list generated in act 206, notifying such client devices to expect a request from the requesting client device for a portion(s) of the requested program (act 216). This notice can allow such client devices to begin any necessary preparations for downloading the requested program to the requesting client device. This notice can also serve a security function, allowing such client devices to know that a subsequent request from the requesting client device is a legitimate request and not an attempt on the part of a malicious user to obtain the requested program.

Figure 3:
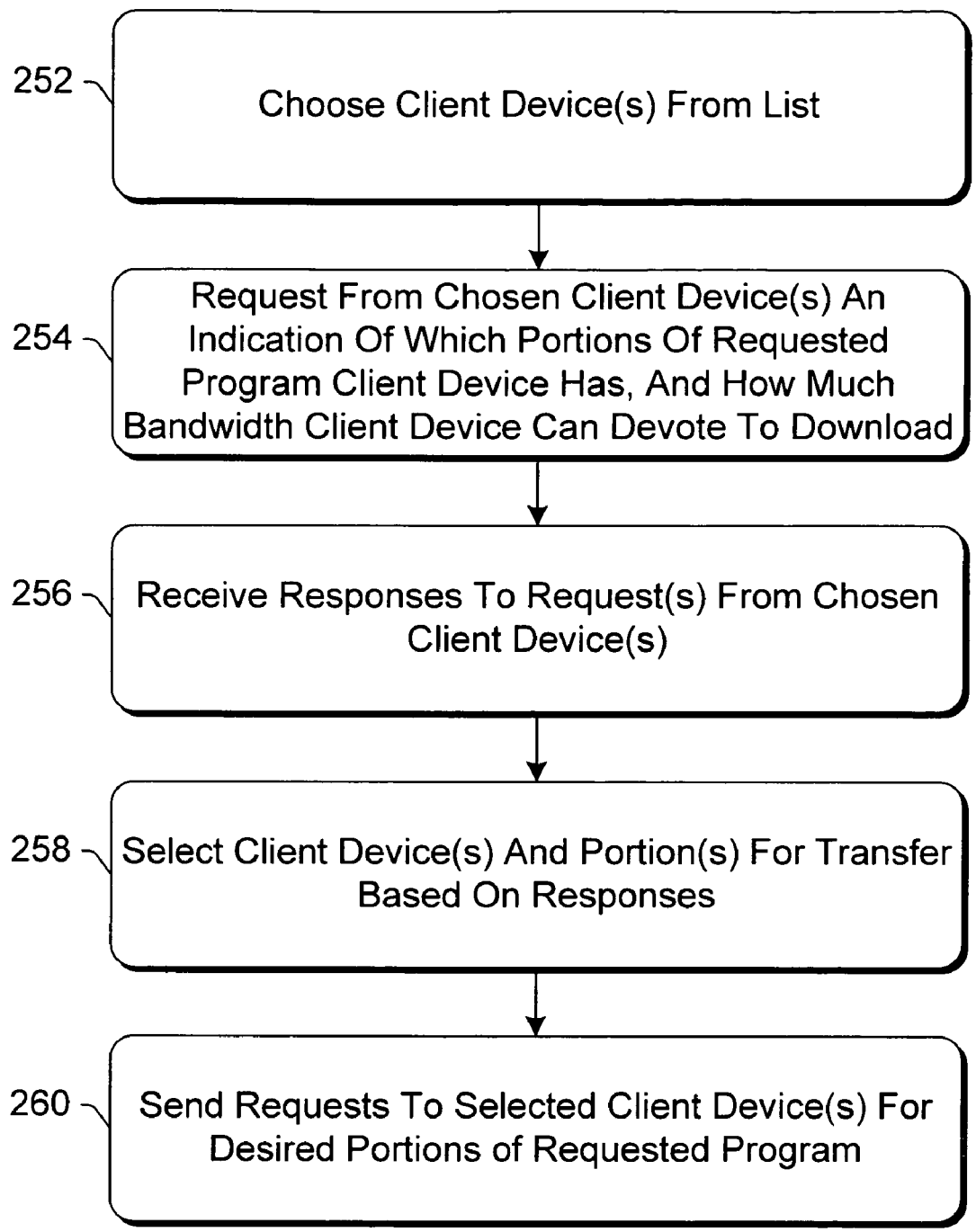
FIG. 3 illustrates an example of requesting portions of a requested program from one or more client devices in additional detail.

The requesting client device then requests and receives portions of the requested program from one or more client devices on the list it received in act 216 (act 218). The determination of which client devices the requesting client device is going to request portions from can vary in different embodiments. FIG. 3 illustrates an example of requesting portions of the requested program from one or more client devices on the list (act 218 of FIG. 2) in additional detail. The order in which the method of FIG. 3 is described is not intended to be construed as a limitation, and any number of the described method acts can be combined in any order to implement the method. Furthermore, the method can be implemented in any suitable hardware, software, firmware, or combination thereof. FIG. 3 is discussed with references to client devices and server devices, which can be, for example, client devices 102 and server devices 104 of FIG. 1.

Initially, the requesting client device chooses one or more client devices from the list it received in act 216 of FIG. 2 (act 252). Which client devices, and how many client devices, are chosen in act 252 can vary. In certain embodiments, the requesting client device chooses all client devices on the list. In other embodiments fewer than all client devices on the list are chosen. How many are chosen can vary, such as a fixed number (e.g., ten or twenty), or a variable number depending on how many are on the list (e.g., ten percent or twenty percent of the number of computing devices on the list). The manner in which the particular client devices are chosen from the list can vary. For example, the client devices may be chosen randomly, in their order of appearance on the list, alphabetically or numerically according to some name or identifier of the client devices, by their available bandwidth, and so forth.

A request is then sent to each client device chosen in act 252, requesting an indication be returned by the chosen client devices as to which portions of the requested program the client device has and how much bandwidth the client device can devote to downloading the requested program to the requesting client device (act 254). Each chosen client device receives the request in act 254 and generates a response, which is received at the requesting client device (act 256). Each chosen client device can readily determine which portion(s) of the requested program the client device has a copy of. The program transfer module of each client device monitors how much of each program is stored in the DVR data of the client device. If an entire program is stored, then the client device has all portions of the program. However, if the client device is itself downloading the requested program from other client device(s), and/or is still recording the requested program as it is being aired, then the program transfer module will know which portions of the program have been stored in the DVR data of the client device.

Each program can be thought of as being separated into portions. In certain embodiments, these portions are a fixed amount (e.g., 10 k bytes or 50 k bytes; the data for presenting $\frac{1}{15}$ of a second or $\frac{1}{30}$ of a second of the program; and so on). In such embodiments, each of the client devices views a portion of the program as this same fixed amount. In such embodiments, the portions can also be identified in numeric order, such as by a 30-minute program including 54,000 $\frac{1}{30}$ of a second portions numbered 1 through 54,000.

In other embodiments, these portions are a variable amount. For example, a particular computing device may indicate that it has the first 4.25 minutes of a program, while another computing device may indicate that it has the first 30 seconds and last ten minutes of a program. Thus, in such embodiments there is no fixed meaning as to how much data a particular portion of a program contains or how long a particular portion of a program is.

The amount of bandwidth that a client device can devote to downloading the requested program to the requesting client device can be determined in different manners. In certain embodiments, each client device is configured to devote no more than a threshold amount of their network bandwidth (the bandwidth between the client device and the network, such as network 106 of FIG. 1) to downloading of requested programs. This can be a fixed amount (e.g., 10 k bytes per second or 100 k bytes per second) or a variable amount (e.g., 20% of the current bandwidth). This amount can include both the transfer of requested programs to requesting client devices as well as the receipt of requested programs from other client devices, or alternatively different threshold amounts of bandwidth can be devoted to the transfer of requested programs to requesting client devices and receipt of requested programs from other client devices.

Requests to multiple chosen client devices in act 254 can be sent out approximately concurrently, with requests being sent without waiting for responses to previous requests to be received. Alternatively, the requests in act 254 can be sent out serially, with the requesting client device waiting for a response to a request from a particular client device before sending a request to another client device.

The requesting client device selects one or more client devices, and the portions of the requested program to obtain from those one or more client devices, based on the responses received in act 256 (act 258). As the responses received in act 258 identify which portions of the requested program can be received from which client devices, the requesting client device can readily determine which client devices have portions of the requested program that the requesting client device does not yet have. Of the client devices that have portions of the requested program that the requesting client device does not yet have, particular ones of those client devices can be selected in act 258 in any of a variety of manners. For example, the client devices may be selected based on how many portions they have that the requesting client device does not yet have, the client devices may be selected based on an order in which they appear in the list received in act 216, the client devices may be selected randomly, the client devices may be selected based on how quickly they responded to the request in act 254 (e.g., assuming that client devices that responded more quickly will also transfer portions of the program more quickly), and so forth.

The requesting client device sends out requests to the client device(s) selected in act 258 for portions of the requested program (act 260). The requesting client device identifies particular portion(s) that it desires from each client device, based on the portions that the client devices have indicated they have, the portions that the requesting client device does not yet have, and the portions that the requesting client device has requested (or will be requesting) from other client devices. It should be noted that the requesting client device can request portions of the requested program in any order—the requesting client device does not need to request the portions in the order they appear in the recorded program. The portions are re-assembled as needed by the requesting client device so that, once all portions are received, the requested program can be played back to the user.

In certain embodiments, the requesting client device is configured to devote no more than a threshold amount of its network bandwidth (the bandwidth between the client device and the network, such as network 106 of FIG. 1) to downloading of requested programs. As discussed above, this threshold amount may apply to only the downloading of requested programs from other client devices, or alternatively may also include the transfer of requested programs to other requesting client devices. The requesting client device selects clients and portions in act 258 up to this threshold amount. For example, assume that the requesting client device is able to devote 100 k bytes per second to downloading the requested program, and that one of the client devices indicated it can devote 10 k bytes per second to downloading the requested program. The requesting client device will select that client device so that portion(s) of the program will be downloaded at 10 k bytes per second from that client device, and the requesting client device will proceed to select other client devices until the remaining 90 k bytes per second of bandwidth are used.

Request(s) are then sent to the client device(s) selected in act 260 to download the desired portion(s) (act 260). The request to a particular client device is typically sent out to that client device as soon as that client device is selected in act 258. Alternatively different timing may be used, such as the requesting client device waiting until all client devices are selected in act 258 before sending any requests in act 260.

Returning to FIG. 2, after requesting and receiving portions of the requested program from client devices on the list in act 218, process 200 continues based on whether all portions of the requested program have been received at the requesting client device (act 220). If all portions have been received, then the transfer of the requested program is complete (act 222). However, if all portions of the requested program have not been received, then the requesting client device requests a new list of client devices that have a copy of at least a portion of the requested program from the server device, and returns to act 214 where the list is received from the server device. By obtaining a new list from the server device, the requesting client device receives a more recent version of the list of client devices that have a copy of at least a portion of the requested program, accounting for client devices that may have deleted the requested program or begun downloading the requested program since the previous list was sent to the requesting client device. Process 200 continues to repeat acts 214, 216, and 218 until all portions of the requested program are received by the requesting client device.

The repeating of acts 214, 216, and 218 can take different forms. Different embodiments can allow for different repeated requests from the same or different client devices until all portions of the requested program are received. For example, the requesting client device may make one pass through acts 252-260 of FIG. 3, downloading some portions of the requested program, and then return to act 214 before requesting any more portions of the requested program. By way of another example, the requesting client device may make multiple passes through acts 258 and 260, repeatedly requesting needed portions of the requested program from the same client device(s) until those client device(s) can no longer send any needed portions to the requesting client device or all portions of the requested program are received at the requesting client device. If those client device(s) can no longer send any needed portions to the requesting client device, then act 252 is repeated and additional client device(s) are selected from the list, and/or act 214 is repeated to obtain a new list of client devices.

By way of yet another example, the requesting client device may make multiple passes through acts 252-260, repeatedly choosing different client devices and requesting needed portions of the requested program from those client devices until those client devices can no longer send any needed portions to the requesting client device or all portions of the requested program are received at the requesting client device. If those client device(s) can no longer send any needed portions to the requesting client device, then act 214 is repeated to obtain a new list of client devices.

Thus, as can be seen from FIGS. 2 and 3, the user is able to request recording of a previously aired program through a user-friendly search interface or EPG. The user can simply search through programs using the search interface or EPG and not be concerned with when the program has been or will be aired. The user is further able to make requests regarding recording options, such as requesting a particular audio or video quality of the recorded program, or requesting a program that has been padded.

Additionally, as can be seen from FIGS. 2 and 3, the requested program is downloaded to the requesting client device from the other client devices in the system. This peer-to-peer networking is used for downloading the requested program to the requesting client device rather than re-transmitting the requested program from the source that originally aired the program, or from some other central repository of programs.

An entire program can be downloaded using the methods of FIGS. 2 and 3. Additionally, in certain embodiments, only part of a program can be downloaded using the methods of FIGS. 2 and 3. For example, a user at a client device may realize he or she has missed the first 30 minutes of a 2-hour movie, but still request that the movie be recorded. In this situation, DVR module 130 of FIG. 1 can begin recording the remaining 90 minutes of the movie as it is aired, and program transfer module 128 can employ the methods of FIGS. 2 and 3 to download the portions of the 2-hour movie that make up the first 30 minutes of the movie. In this example, the needed portions of the program would be only those portions that make up the first 30 minutes of the movie—the remaining portions would not be needed by the client device because it is recording them as the movie is aired.

It should also be noted that the methods of FIGS. 2 and 3 are discussed with the downloading being coordinated by the requesting client device. For example, the requesting client device selects which portion(s) of the requested program are to be downloaded from which other client device(s). Alternatively, the server device, such as server device 104(1) of FIG. 1, may coordinate the downloading of the portions to the requesting client device. In such embodiments the downloading still occurs between the client devices, but the server device is selecting, for example, which portion(s) of the requested program are to be downloaded from which other client device(s).

Figure 4:
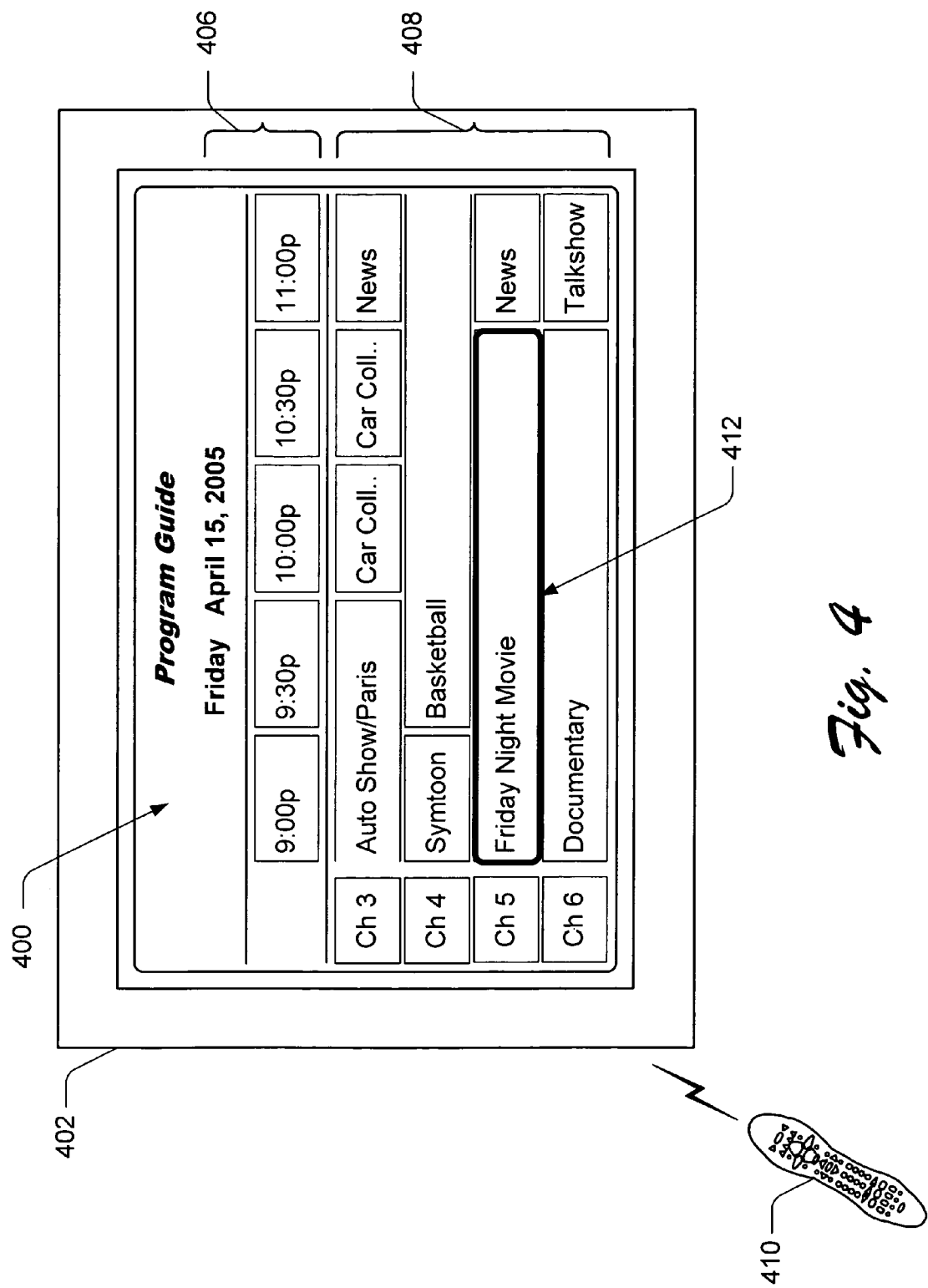
FIG. 4 illustrates an example electronic program guide (EPG).

FIG. 4 illustrates an example EPG 400 displayed on a display device 402 of a client device, such as on a television coupled to or included as part of a client device 102 of FIG. 1. EPG 400 can be activated in any of a variety of manners, such as by selecting a "guide" or "menu" button on an input device such as remote control 410. EPG 400 is displayed by, for example, EPG module 122 of FIG. 1 using the data in EPG data 124.

EPG 400 enables a user to navigate a program grid, select a program, and initiate receiving the selected program. EPG 400 includes a time portion 406 and a program data portion 408 (also referred to as a grid). Time portion 406 identifies the date and time of the airing of programs in program data portion 408. This date and time can be in the past, present, or future. A user can scroll through EPG 400, scrolling vertically to display different channels and scrolling horizontally to display different times (and possibly dates), by manipulating an input device such as remote control 410 via which the user can input control commands.

EPG 400 also includes a selectable control 412 shown implemented as an on-screen focus that can be positioned to identify a desired program. A user can move selectable control 412 within EPG 400, and can request to record a desired program by positioning selectable control 412 on the desired program and entering a record request (e.g., by pressing a "Record" button on remote control 410). If the desired program will be aired in the future, then the client device (e.g., DVR module 130 of FIG. 1) records the desired program when it is aired. If, on the other hand, the desired program has already been aired, then the client device (e.g., program transfer module 128) attempts to copy the desired program from other client devices that did record the program when it was aired, as discussed above.

Figure 5:
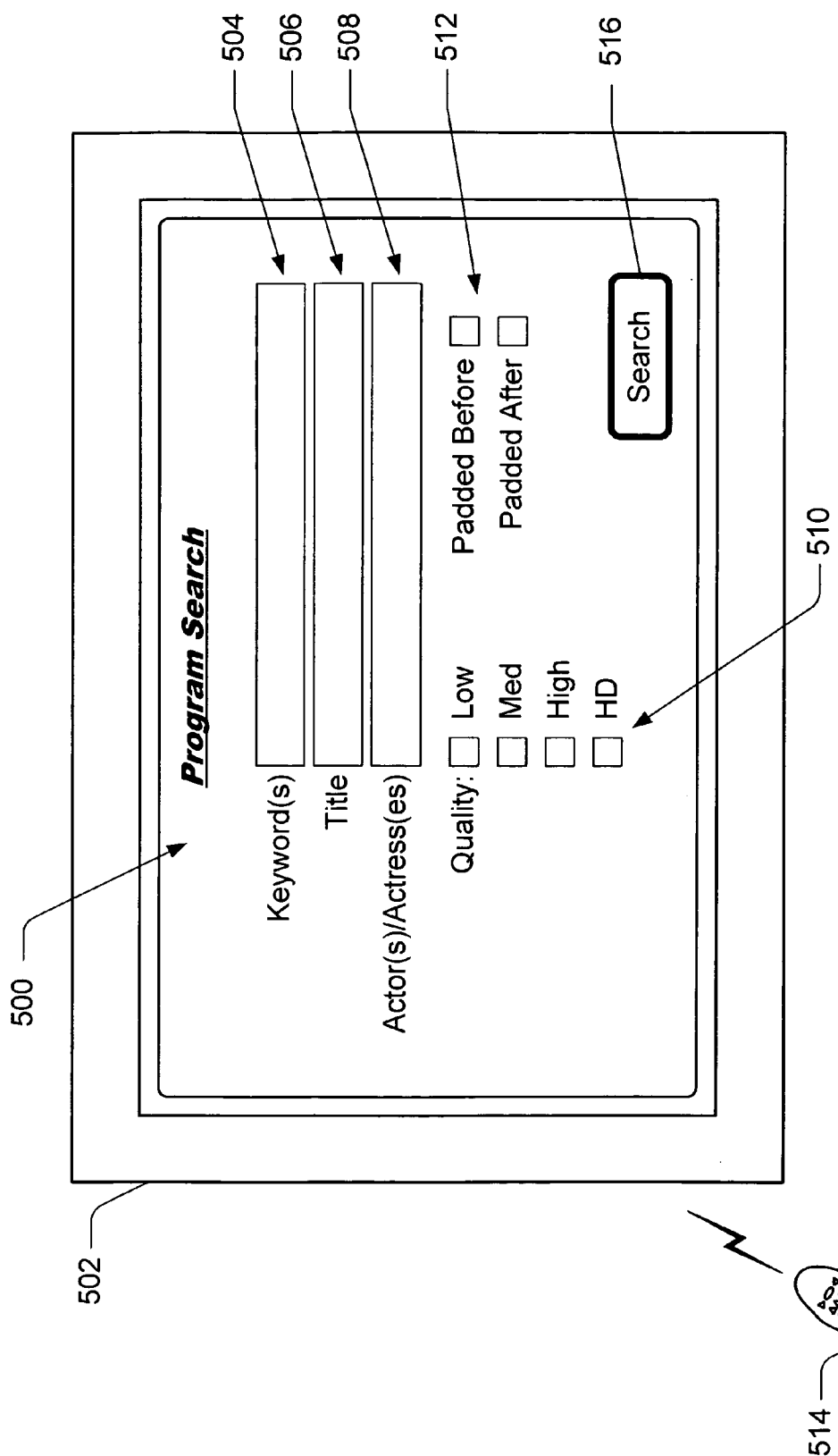
FIG. 5 illustrates an example program search interface.

FIG. 5 illustrates an example program search interface 500 displayed on a display device 502 of a client device, such as on a television coupled to or included as part of a client device 102 of FIG. 1. Program search interface 500 is displayed by, for example, program search module 126 of FIG. 1 using the data in EPG data 124. Search interface 500 can be activated in any of a variety of manners, such as by selecting a "search" button on an input device such as remote control 514, or using an input device such as remote control 514 to navigate through an on-screen menu to locate a "search" option. Program search interface 500 includes various fields and checkboxes that allow a user to enter various search criteria to search through in an attempt to locate a particular aired program(s) in the past, present, or future.

In the example interface 500, a keyword field 504 allows the user to enter one or more keywords that may occur in the title or other description of aired programs. A title field 506 allows the user to enter one or more words that may occur in the title of aired programs. An actor(s)/actress(es) field 508 allows the user to enter one or more names of actors and/or actresses that may appear in aired programs. Not all fields 504, 506, and 508 need be filled out, although typically at least one field should include data for the search. A quality portion 510 includes multiple checkboxes allowing the user to select a particular desired quality for the programs, and a padded portion 512 includes multiple checkboxes allowing the user to select whether the program should have been padded before (prior to when the program was to be aired) or after (after the program was to be finished airing).

The user can enter his or her desired selections, and then select a search button 516. In response to activating the search button, the client device searches the EPG data, identifies any programs that satisfy the search criteria, and presents identifiers of those programs to the user. Alternatively, no search button 516 may be included. In such alternate embodiments, rather than having the user select the search button, the search may be performed each time an additional input is made to program search interface 500 (e.g., a word entered, or a checkbox selected).

Data can be entered in program search interface 500 in a variety of manners. For example, an input device, such as remote control 514, may include alphanumeric keys or a touchscreen via which letters, numbers, and/or other symbols may be entered. By way of another example, an on-screen keyboard (not shown) may be displayed to the user, and the user can navigate to different keys on the keyboard using an input device, such as remote control 514. The user can navigate to different fields or checkboxes in interface 500 by manipulating an input device, such as remote control 514.

Figure 6:
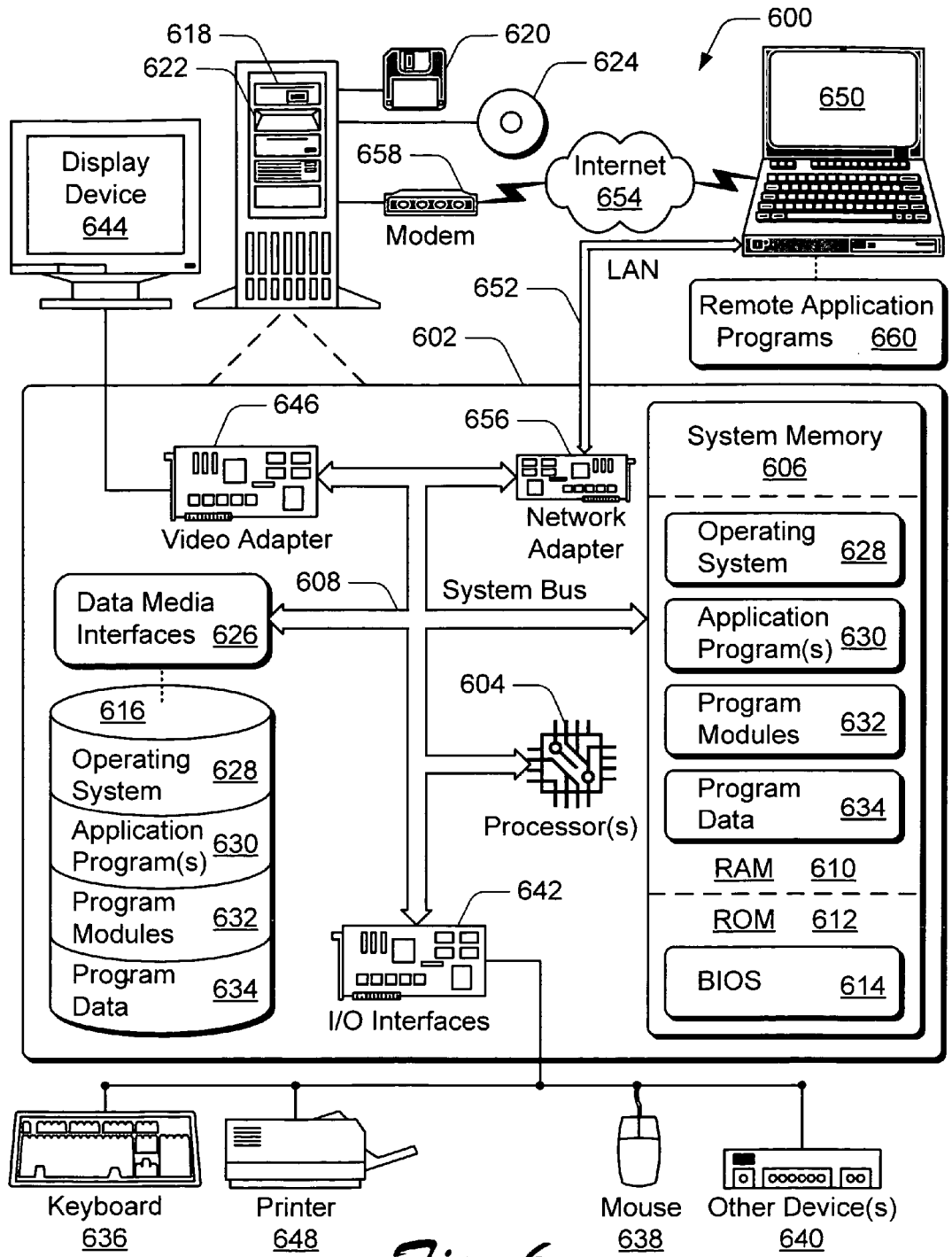
FIG. 6 illustrates an example computing environment within which downloading previously aired programs using peer-to-peer networking described herein can be fully or partially implemented.

FIG. 6 illustrates an example computing environment 600 within which downloading previously aired programs using peer-to-peer networking described herein can be fully or partially implemented. Computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

It should be noted that a computing system environment or configuration need not include all of the components illustrated in FIG. 6. For example, a computing system environment or configuration may include a set top box that includes a processor or other microcontroller, a system memory (which may included RAM and/or ROM), a network adapter, a hard disk drive, and an I/O interface to receive commands from a remote control. Other application programs and I/O interfaces may not be included in the set top box, and no printer or mouse may be coupled to the set top box.

The computing environment 600 includes a general-purpose computing system in the form of a computing device 602. Computing device 602 can be, for example, a client device 102 or server device 104 of FIG. 1. The components of computing device 602 can include, but are not limited to, one or more processors 604 (e.g., any of microprocessors, controllers, security processors or co-processors, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes volatile and non-volatile media, and removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, modem (e.g., allowing coupling to a conventional telephone line, a DSL connection, cable, and/or other type of connection), serial port, scanner, remote control, PDA (personal digital assistant), cellular phone, and/or the like. These and other input devices are connected to the processors 604 via input/output interfaces 642 that are coupled to the system bus 608, but may be connected by other interface and bus structures, such as a parallel port, a game port, a universal serial bus (USB), an infrared (IR) port, an 802.11 port, a Bluetooth port, and so on.

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer, such as computing device 602 of FIG. 6. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the subject of the appended claims is not limited to the specific features or acts described. Rather, the specific features and acts are disclosed as example forms of implementing the invention.

What is claimed is:

1. A method of notification over a communications network comprising:
   receiving, at a central server, a request from a requesting client device, the request identifying a previously aired program;
   verifying, at the central sever, that the requesting client device was authorized to record the previously aired program at a time that the previously aired program was originally aired;
   sending, from the central server to the requesting client device, a list of a plurality of client devices that have at least a portion of the previously aired program, wherein the list is sent to the requesting client device from the central server only if the requesting client device was authorized to record the previously aired program at the time that the previously aired program was originally aired;
   sending, from the central server, to each of the plurality of client devices, a notice to expect a request from the requesting client device at a random time regarding downloading portions of the previously aired program, wherein the notice from the central server serves a security function, and wherein the notice notifies the plurality of client devices of a legitimacy of an expected request.

2. A method as recited in claim 1, further comprising:
   including, in the list, an Internet Protocol (IP) address for each of the one or more other client devices.

3. A method as recited in claim 1, further comprising:
   including, in the list, one or more parameters for each of the one or more other client devices, the one or more parameters for each client device indicating a quality level of the requested program recorded on the client device.

4. A method as recited in claim 1, further comprising:
   checking data identifying which other client devices have recorded but not yet deleted the previously aired program; and
   including, in the list, only those other client devices that have recorded the requested program using a same one or more parameters requested by the requesting client device, and that have not yet deleted the previously aired program.

5. One or more computer storage devices having a plurality of instructions that, when executed by one or more processors of a first client device, causes the one or more processors to:
   receive, at the first client device, a notice from a central server to expect a request from a second client device at a random time regarding downloading portions of a previously aired program, wherein the central server verifies that the second client device was authorized to record the previously aired program at a time that the previously aired program was originally aired before sending the notice to the first client device,
   wherein the notice from the central server serves a security function, wherein the notice notifies the first client device of a legitimacy of an expected request by the second client device;
   receive, from the second client device at the first client device, a request for an indication of how much bandwidth the first client device has available for downloading at least a portion of the previously aired program and an indication of which portions of the previously aired program the first client device has; and send, from the first client device to the second client device, an indication of how much bandwidth the first client device has available for downloading at least a portion of the previously aired program and an indication of which portions of the previously aired program are stored on the first client device.

6. One or more computer storage devices having a plurality of instructions that, when executed by one or more processors, causes the one or more processors to:
receive, at a central server from a first client device, a request for recording of a previously aired program;
verify, at the central server, that the first client device was authorized to record the previously aired program at a time that the previously aired program was originally aired;
generate, at the central server, a list identifying one or more other client devices that may have a copy of one or more portions of the previously aired program;
send, from the central server to the first client device, the list only if the requesting client was authorized to record the previously aired program at the time that the previously aired program was originally aired;
send, to each of the one or more other client devices from the central server, a notice to expect a request from the first client device at a random time regarding downloading portions of the previously aired program,
wherein the notice from the central server serves a security function, wherein the notice notifies the one or more other client devices of a legitimacy of an expected request;
send, from the first device to the one or more other client devices, a request for an indication of how much bandwidth each of the one or more other client devices has available for downloading at least a portion of the previously aired program and an indication of which portions of the previously aired program are available for downloading;
send, from each of the one or more other client devices to the first device, an indication of how much bandwidth each of the one or more other client devices has available for downloading portions of the previously aired program and an indication of which portions are available for downloading from each of the one or more other client devices;
select, at the first device, one or more other client devices to download from, wherein selecting the one or more other client devices comprises:
determining, by the first client device, an amount of network bandwidth the first client device has dedicated to downloading previously aired programs; and
selecting a combination of the one or more other clients such that a summation of the indicated bandwidths of the combination of the one or more other client devices is less than or equal the amount of network bandwidth the first client device has dedicated to downloading previously aired programs.

7. One or more computer storage devices as recited in claim 6, wherein the plurality of instructions further cause the one or more processors to:
include, in the list, an Internet Protocol (IP) address for each of the one or more other client devices.

8. One or more computer storage devices as recited in claim 6, wherein the plurality of instructions further cause the one or more processors to:
include, in the list, one or more parameters for each of the one or more other client devices, the one or more parameters for each client device indicating a quality level of the requested program recorded on the client device.

9. One or more computer storage devices as recited in claim 6, wherein to generate the list is to:
check data identifying which other client devices have recorded but not yet deleted the previously aired program; and
include, in the list, only those other client devices that have recorded the requested program using a same one or more parameters requested by the first client device, and that have not yet deleted the previously aired program.

10. One or more computer storage devices as recited in claim 6, wherein the selecting the one or more other client device further comprises:
selecting the combination of the one or more other clients such that each of the one or more of the other clients each would transmits a different portion of the previously aired program.

11. One or more computer storage devices as recited in claim 10, wherein each different portion, when summed together, contains an entirety of the previously aired program.

12. One or more computer storage devices as recited in claim 6, wherein the selecting the one or more other client device further comprises:
selecting the combination of the one or more other clients based upon an order in which the one or more other clients are arranged in the list.

13. One or more computer storage devices as recited in claim 6, wherein the selecting the one or more other client device further comprises:
selecting the combination of the one or more other clients based upon how quickly each of the one or more other clients responds to the request for indications.

14. One or more computer storage devices as recited in claim 6, wherein the selecting the one or more other client device further comprises:
selecting the combination of the one or more other clients randomly.

15. One or more computer storage devices as recited in claim 6, wherein the plurality of instructions further cause the one or more processors to:
present, to a user of the first client device, an electronic programming guide; and
receive, from a user of the first client device, a selection of the previously aired program from the electronic programming guide, wherein the program was aired prior to a time when the selection is received.

16. One or more computer storage devices as recited in claim 6, wherein the plurality of instructions further cause the one or more processors to:
present, to a user of the first client device, a search interface;
receive, at the central server from the user of the first client device, search criteria;
compare, at the central server, the search criteria to data describing a plurality of programs, wherein the plurality of programs include one or more programs having been aired prior to a time when the search criteria is received;
present, to the user of the first client, an identifier of each of the one or more of the plurality of programs that satisfy the search criteria; and
receive, from the user of the first client device, a selection of one of the identifiers, the selected identifier identifying the previously aired program.

* * * * *